US009479780B2

(12) United States Patent
Kung et al.

(10) Patent No.: US 9,479,780 B2
(45) Date of Patent: Oct. 25, 2016

(54) SIMPLIFICATION OF SIGNIFICANCE MAP CODING

(71) Applicant: Google Technology Holdings LLC, Mountain View, CA (US)

(72) Inventors: Wei-Ying Kung, San Diego, CA (US); Krit Panusopone, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 520 days.

(21) Appl. No.: 13/678,183

(22) Filed: Nov. 15, 2012

(65) Prior Publication Data
US 2013/0195182 A1 Aug. 1, 2013

Related U.S. Application Data

(60) Provisional application No. 61/593,779, filed on Feb. 1, 2012.

(51) Int. Cl.
| | | |
|---|---|---|
| *H04N 19/00* | (2014.01) | |
| *H04N 19/60* | (2014.01) | |
| *H04N 19/46* | (2014.01) | |
| *H04N 19/91* | (2014.01) | |
| H04N 19/13 | (2014.01) | |

(52) U.S. Cl.
CPC ........ *H04N 19/00775* (2013.01); *H04N 19/00* (2013.01); *H04N 19/46* (2014.11); *H04N 19/91* (2014.11)

(58) Field of Classification Search
CPC ................. H04N 19/46; H04N 19/00; H04N 19/00775; H04N 19/91; H04N 19/13
See application file for complete search history.

(56) References Cited

U.S. PATENT DOCUMENTS

| | | | |
|---|---|---|---|
| 6,014,095 A | 1/2000 | Yokoyama | |
| 7,158,684 B2 | 1/2007 | Cheung et al. | |
| 2005/0123207 A1 | 6/2005 | Marpe et al. | |
| 2006/0103556 A1 | 5/2006 | Malvar | |
| 2007/0154090 A1* | 7/2007 | Howard ................. | H03M 7/40 382/170 |
| 2008/0013633 A1 | 1/2008 | Ye et al. | |
| 2008/0231483 A1 | 9/2008 | He et al. | |

(Continued)

FOREIGN PATENT DOCUMENTS

| | | |
|---|---|---|
| WO | WO2008153270 | 12/2008 |
| WO | WO2011142817 A1 | 11/2011 |
| WO | WO2012095488 | 7/2012 |

OTHER PUBLICATIONS

Aaron Kiely: "Selecting the Golomb Parameter in Rice Coding", IPN Progress Report,, vol. 42-159, Nov. 15, 2004, all pages.

(Continued)

*Primary Examiner* — Mohammed Jebari
(74) *Attorney, Agent, or Firm* — Young Basile Hanlon & MacFarlane, P.C.

(57) ABSTRACT

In one embodiment, a method for encoding video data is provided that includes receiving an array of transform coefficients corresponding to a luma component or a chroma component of the video data. The method further includes encoding a significance map for the array, where the encoding includes selecting, using a shared context derivation process that applies to both the luma component and the chroma component, context models for encoding significance values in the significance map.

4 Claims, 10 Drawing Sheets

(56) References Cited

U.S. PATENT DOCUMENTS

| | | | |
|---|---|---|---|
| 2008/0267513 A1* | 10/2008 | Sankaran | 382/232 |
| 2008/0310503 A1 | 12/2008 | Lee et al. | |
| 2009/0175332 A1* | 7/2009 | Karczewicz et al. | 375/240.03 |
| 2009/0232204 A1 | 9/2009 | Lee et al. | |
| 2011/0206289 A1 | 8/2011 | Dikbas et al. | |
| 2012/0128067 A1 | 5/2012 | Liu et al. | |
| 2012/0207222 A1* | 8/2012 | Lou et al. | 375/240.18 |
| 2012/0230417 A1* | 9/2012 | Sole Rojals et al. | 375/240.18 |
| 2013/0003858 A1* | 1/2013 | Sze | 375/240.18 |
| 2013/0016789 A1 | 1/2013 | Lou et al. | |
| 2013/0101046 A1* | 4/2013 | Korodi et al. | 375/240.18 |
| 2013/0114685 A1 | 5/2013 | Kerofsky et al. | |
| 2013/0114698 A1 | 5/2013 | Lou et al. | |
| 2013/0182758 A1* | 7/2013 | Seregin | H04N 19/13 375/240.02 |
| 2013/0182773 A1* | 7/2013 | Seregin | H04N 19/13 375/240.18 |
| 2013/0188694 A1 | 7/2013 | Lou et al. | |
| 2013/0188727 A1 | 7/2013 | Lou et al. | |
| 2013/0188729 A1 | 7/2013 | Lou et al. | |
| 2013/0188734 A1 | 7/2013 | Kim et al. | |
| 2013/0195182 A1 | 8/2013 | Kung et al. | |
| 2013/0195370 A1 | 8/2013 | Sasai et al. | |
| 2013/0202026 A1 | 8/2013 | Fang et al. | |
| 2013/0202029 A1 | 8/2013 | Lou et al. | |
| 2013/0322547 A1 | 12/2013 | Lou et al. | |

OTHER PUBLICATIONS

Bross B et al.: "WD4: Working Draft 4 of High-Efficiency Video Coding", 6. JCT-VC Meeting; 97, MPEG Meeting; Jul. 14, 2011-Jul. 22, 2011; Torino; (Joint Collaborative Team on Video Coding of ISO/IEC JTC1/SC291WG11 and ITU-T SG. 16); URL:http://wftp3.itu.int/av-arch/jctvc-site/, No. JCTVC-F803, Sep. 8, 2011, all pages.

Guo L. et al.: "CABAC Contexts Reduction for Last Position Coding", 8. JCT-VC Meeting; 99 MPEG Meeting; Jan. 2, 2012 Oct. 2, 2012; San Jose; (Joint Collaborative Team on Video Coding of ISO/IEC JTC1/SC29/WG11 and ITU-T-SG. 16); URL:http://wftp3.itu.int/av-arch/jctvc-site/,, No. JCTVC-H)537, Jan. 21, 2012, all pages.

Heising et al., "CABAC and ABT" Joint Video Team (JVT) of ISO/IEC MEPG & ITU-T VCEG (ISO/IEC JTC1/SC29/W1 and ITU-T SG16 Q.6) 4th Meeting: Klagenfurt, Austria; Jul. 22-26, 2002; 14 pages.

ISR, "ISR Search Report and Written Opinion of the International Searching Authority" for International Application No. ISR/US2012/046960 dated Feb. 25, 2013, 19 pages.

ISR, "ISR Search Report and Written Opinion of the International Searching Authority" for International Application No. ISR/US2012/064229 (1069B) dated Feb. 4, 2014, 1220 pages.

ISR, "ISR Search Report and Written Opinion of the International Searching Authority" for International Application No. ISR/US2013/022306 (1084B) dated Mar. 28, 2013, 14 pages.

ISR, "ISR Search Report and Written Opinion of the International Searching Authority" for International Application No. ISR/US2013/022312 (1085B) dated Apr. 2013, 14 pages.

ISR, & Written Opinion of the International Searching Authority for International Application No. ISR/US2013/024654 (1090B), May 7, 2013, 11 pages.

ISR, & Written Opinion of the International Searching Authority for International Application No. ISR/US2013/024786 (1091B), May 21, 2013, 11 pages.

Kurcerin et al., "Improvements on CABAC" ITU-Telecommunications Standardization Sector; Study Group 16 Question 6; Video Coding Experts Group (VCEG) 14th Meeting: Santa Barbara, CA, USA; Sep. 24-27, 2001; 6 pages.

Lou J et al.: "On coeff_abs_level_minus3 coding", 7 JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL:http://wftp3.itu.int/av-arch/jctvc-site/,,No. JCTVC-G700, Nov. 9, 2011, all pages.

Malvar HS: "Adaptive run-length/Golomb-Rice encoding of quantized generalized Gaussian sources with unknown statistics," Proceddings, DCC 2006, Data Compression Conference, Mar. 28, 2006-Mar. 30, 2006, all pages, IEEE Compt. Society Los Alamitos, CA USA.

Marpe et al., Context-Based Adaptive Binary Arithmetic Coding in the H.264/AVC Video Compression Standard, Detlev marpe, IEEE Transactions on Circuits and Systems for Video Technology, vol. 13, No. 7, Jul. 2003, 17 pages.

Wien, Mathias "Variable Block-Size Transforms for Hybrid Video Coding" Dissertation Der Rheinisch-Westfaelischen Technischen Hochschule Aachen; Aachen, Germany; Feb. 3, 2004; 184 pages.

Nguyen (Fraunhofer HHI)T: "CE:11 Coding of Transform Coefficient Levels with Golomb-Rice codes," Mar. 10, 2011, all pages.

Nguyen et al., "Proposed Cleanup for Transform Coefficient Coding," Joint Collaborative Team on Video Coding. JCTVC-H0228, Feb. 1, 2012.

Nguyen T et al.: "Reduced-complexity entropy coding of transform coefficient labels using a combination of VLC and PIPE," 4. JCT-VC Meeting; 95. Mpeg Meeting; Jan. 20, 2011-Jan. 28, 2011; Daegu; (Joint Collaborative Team on Video Coding of ISO/IEC JTC1/SC29/WG11 and ITU-T SG16); URL: http://wftp3.itu.int/av-arch/jctvc-site/. No. JCTVC-D336, Jan. 16, 2011 all pages.

Nguyen, Tung et al.: "Reduced-complexity entropy coding of transform coefficient levels using truncated golomb-rice codes in video compression", Image Processing (ICIP), 2011 18th IEEE Internation Conference on, IEEE, Sep. 11, 2011, all pages.

Office Action mailed Dec. 18, 2014 in co-pending Japanese Application.

Sole et al., "Unified scans for the significance map and coefficient level coding in high coding efficiency," Joint Collaborative Team on Video Coding, JCTVCF-288 Geneva, Jul. 8, 2011.

Sze, "Reduction in contexts used for significant coeff_flag and coefficient level" Joint Collaborative Team on Video Coding (JCT-VC) of ITU-T S6 WB3 and ISO/IEC JTC1/SC29/W1; 6th Meeting: Torino, IT; Jul. 14-22, 2011; 4 pages.

Wiegand, T. "Joint Committee Draft" Draft ISO/IEC 14496-10: 2002 ( E ); Joint Video Team (JVTC167) of ISO/IEC MGPG and ITU-T-VCEG; 3rd Meeting; Fairfax, Virginia, USA; May 6-10, 2002; 142 pages.

Auyeung, et al.; Context Reduction of Significance Map Coding With CABAC; JCTVC-G1015; 7th Meeting: Geneva, CH, Nov. 21-30, 2011.

Sole, et al.; NON-CE11: Diagonal Sub-Block Scan for the Residual Coding; JCTVC-G323; 7th Meeting: Geneva, CH, Nov. 21-30, 2011.

Nguyen, et al.; Multi-Level Significance Maps for Large Transform Units; JCTVC-G644; 7th Meeting: Geneva, Nov. 21-30, 2011.

Korean Office Action in related matter. KR1020147001166 citing new art, dated Sep. 15, 2015.

Bankoski et al. "Technical Overview of VP8, An Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Overview; VP7 Data Format and Decoder. Version 1.5. On2 Technologies, Inc. Dated Mar. 28, 2005.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced

(56) References Cited

OTHER PUBLICATIONS video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual service—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.

* cited by examiner

GENERAL ELEMENTS HAVE UP TO 5 NEIGHBORS

SPECIAL ELEMENTS HAVE UP TO 4 NEIGHBORS

LUMA OR CHROMA

SIMPLIFICATION OF SIGNIFICANCE MAP CODING

CROSS-REFERENCES TO RELATED APPLICATIONS

The present application claims the benefit and priority under 35 U.S.C. 119(e) of U.S. Provisional Application No. 61/593,779, filed Feb. 1, 2012, entitled "SIMPLIFICATION OF SIGNIFICANCE MAP CODING FOR CABAC," the entire contents of which are incorporated herein by reference for all purposes.

BACKGROUND

Video compression (i.e., coding) systems generally employ block processing for most compression operations. A block is a group of neighboring pixels and is considered a "coding unit" for purposes of compression. Theoretically, a larger coding unit size is preferred to take advantage of correlation among immediate neighboring pixels. Certain video coding standards, such as Motion Picture Expert Group (MPEG)-1, MPEG-2, and MPEG-4, use a coding unit size of 4×4, 8×8, or 16×16 pixels (known as a macroblock).

High efficiency video coding (HEVC) is an alternative video coding standard that also employs block processing. As shown in FIG. 1, HEVC partitions an input picture 100 into square blocks referred to as largest coding units (LCUs). Each LCU can be as large as 128×128 pixels, and can be partitioned into smaller square blocks referred to as coding units (CUs). For example, an LCU can be split into four CUs, each being a quarter of the size of the LCU. A CU can be further split into four smaller CUs, each being a quarter of the size of the original CU. This partitioning process can be repeated until certain criteria are met. FIG. 2 illustrates an LCU 200 that is partitioned into seven CUs (202-1, 202-2, 202-3, 202-4, 202-5, 202-6, and 202-7). As shown, CUs 202-1, 202-2, and 202-3 are each a quarter of the size of LCU 200. Further, the upper right quadrant of LCU 200 is split into four CUs 202-4, 202-5, 202-6, and 202-7, which are each a quarter of the size of quadrant.

Each CU includes one or more prediction units (PUs). FIG. 3 illustrates an example CU partition 300 that includes PUs 302-1, 302-2, 302-3, and 302-4. The PUs are used for spatial or temporal predictive coding of CU partition 300. For instance, if CU partition 300 is coded in "intra" mode, each PU 302-1, 302-2, 302-3, and 302-4 has its own prediction direction for spatial prediction. If CU partition 300 is coded in "inter" mode, each PU 302-1, 302-2, 302-3, and 302-4 has its own motion vector(s) and associated reference picture(s) for temporal prediction.

Further, each CU partition of PUs is associated with a set of transform units (TUs). Like other video coding standards, HEVC applies a block transform on residual data to decorrelate the pixels within a block and compact the block energy into low order transform coefficients. However, unlike other standards that apply a single 4×4 or 8×8 transform to a macroblock, HEVC can apply a set of block transforms of different sizes to a single CU. The set of block transforms to be applied to a CU is represented by its associated TUs. By way of example, FIG. 4 illustrates CU partition 300 of FIG. 3 (including PUs 302-1, 302-2, 302-3, and 302-4) with an associated set of TUs 402-1, 402-2, 402-3, 402-4, 402-5, 402-6, and 402-7. These TUs indicate that at least seven separate block transforms should be applied to CU partition 300, where the scope of each block transform is defined by the location and size of each TU.

Although not shown in FIG. 4, each TU 402-1, 402-2, 402-3, 402-4, 402-5, 402-6, and 402-7 may, in some cases, be further separated out into a number of color component-specific TUs. Each color component-specific TU includes elements or samples that are defined for that color channel in corresponding CU partition 300. For instance, in the case of a YCbCr video input, TU 402-1 may be separated out into three distinct color component-specific TUs—one luma TU, one chroma TU, and another chroma TU.

Once a block transform operation has been applied with respect to a particular TU, a two-dimensional array of transform coefficients is generated. The transform coefficients are quantized to reduce the size of the coefficient data. The quantized transform coefficients are then entropy coded, resulting in a final set of compression bits. HEVC currently offers an entropy coding scheme known as context-based adaptive binary arithmetic coding (CABAC). CABAC can provide efficient compression due to its ability to adaptively select context models (i.e., probability models) for arithmetically coding input symbols based on previously-coded symbol statistics. However, the context model selection process in CABAC is complex and requires significantly more processing power for encoding/decoding than other compression schemes.

SUMMARY

In one embodiment, a method for encoding video data is provided that includes receiving an array of transform coefficients corresponding to a luma component or a chroma component of the video data. The method further includes encoding a significance map for the array, where the encoding includes selecting, using a shared context derivation process that applies to both the luma component and the chroma component, context models for encoding significance values in the significance map.

In another embodiment, a method for decoding video data is provided that includes receiving a bitstream of compressed data, the compressed data including an array of transform coefficients that was previously encoded, the array corresponding to a luma component or a chroma component of the video data. The method further includes decoding a significance map for the array, wherein the decoding includes selecting, using a shared context derivation process that applies to both the luma component and the chroma component, context models for decoding significance values in the significance map.

In another embodiment, a non-transitory computer-readable storage medium is provided that has stored thereon program code executable by a processor for encoding video data. The program code includes code that causes the processor to receive an array of transform coefficients corresponding to a luma component or a chroma component of the video data. The program code further includes code that causes the processor to encode a significance map for the array, where the code that causes the processor to encode the significance map includes code that causes the processor to select, use a shared context derivation process that applies to both the luma component and the chroma component, context models for encoding significance values in the significance map.

In another embodiment, a non-transitory computer-readable storage medium is provided that has stored thereon program code executable by a processor for decoding video data. The program code includes code that causes the processor to receive a bitstream of compressed data, the compressed data including an array of transform coefficients that was previously encoded, the array corresponding to a luma component or a chroma component of the video data. The program code further includes code that causes the processor to decode a significance map for the array, where the code that causes the processor to decode the significance map includes code that causes the processor to select, use a shared context derivation process that applies to both the luma component and the chroma component, context models for decoding significance values in the significance map.

The following detailed description and accompanying drawings provide a better understanding of the nature and advantages of particular embodiments.

DETAILED DESCRIPTION

Described herein are techniques for simplified significance map coding within a context-adaptive entropy coding scheme such as CABAC. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Encoder and Decoder Embodiments

Figure 1:
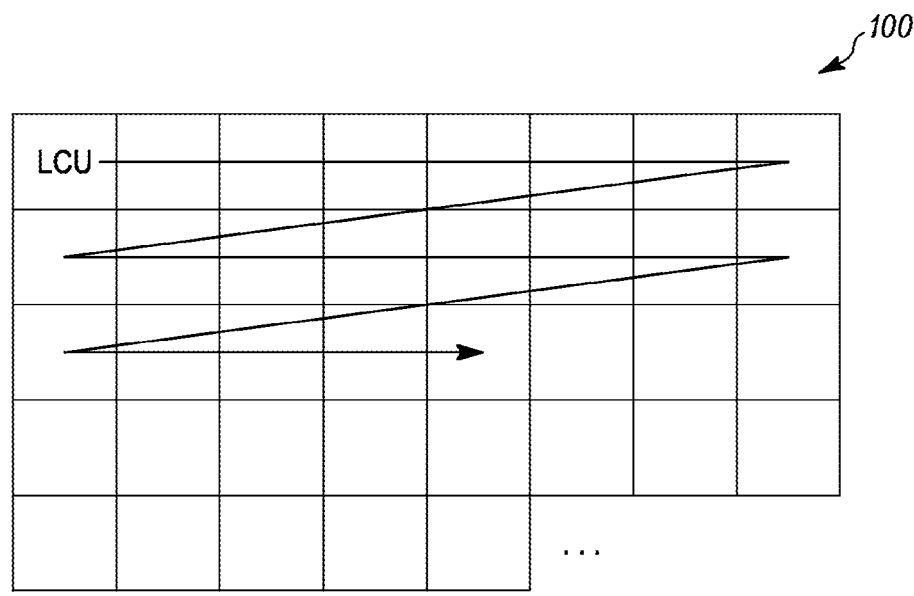
FIG. 1 illustrates an input picture partitioned into largest coding units (LCUs).
Figure 2:
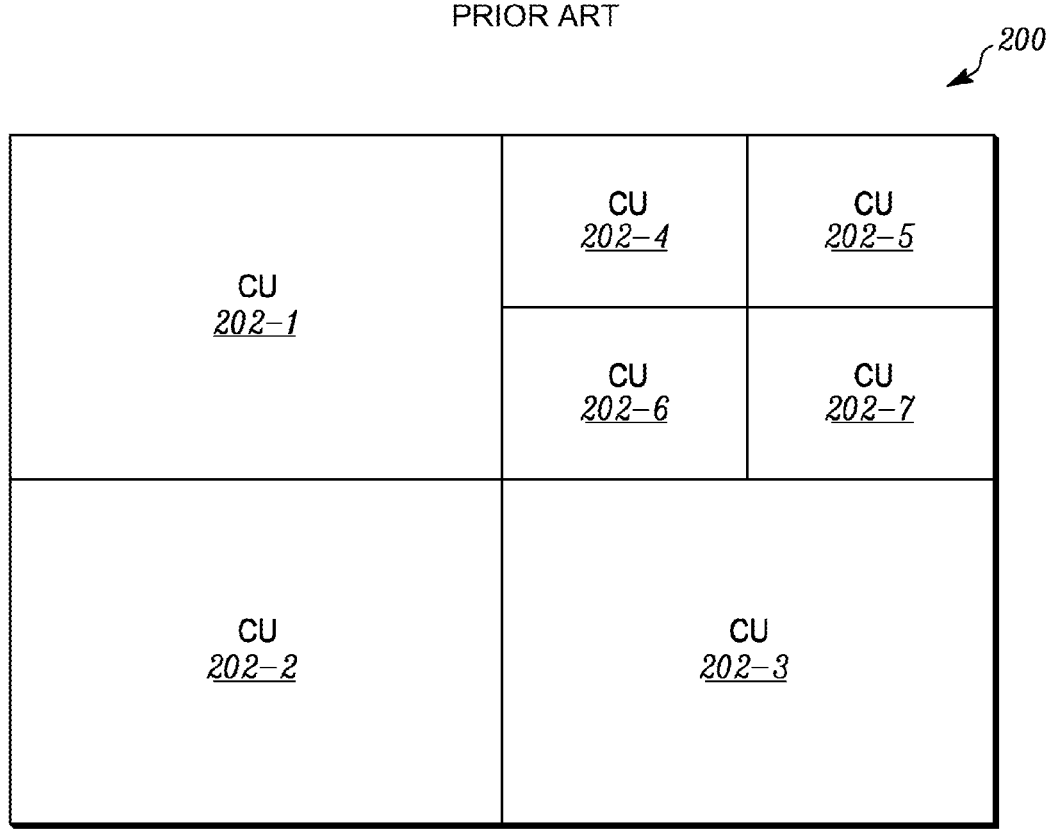
FIG. 2 illustrates an LCU partitioned into coding units (CUs).
Figure 3:
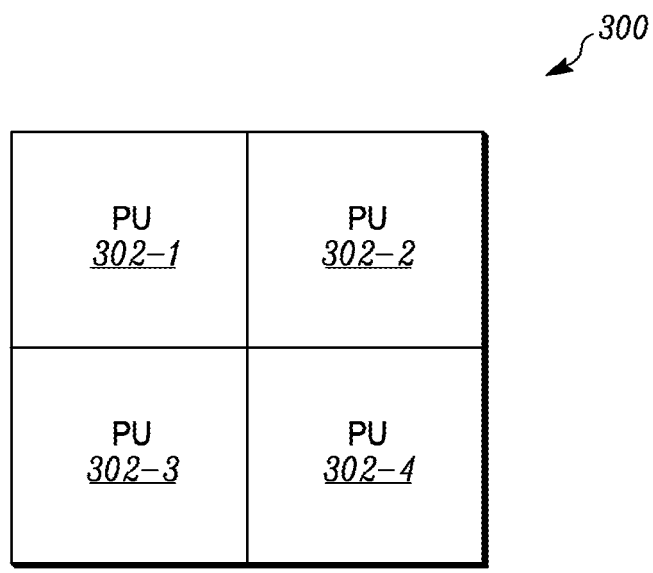
FIG. 3 illustrates a CU partitioned into prediction units (PUs).
Figure 4:
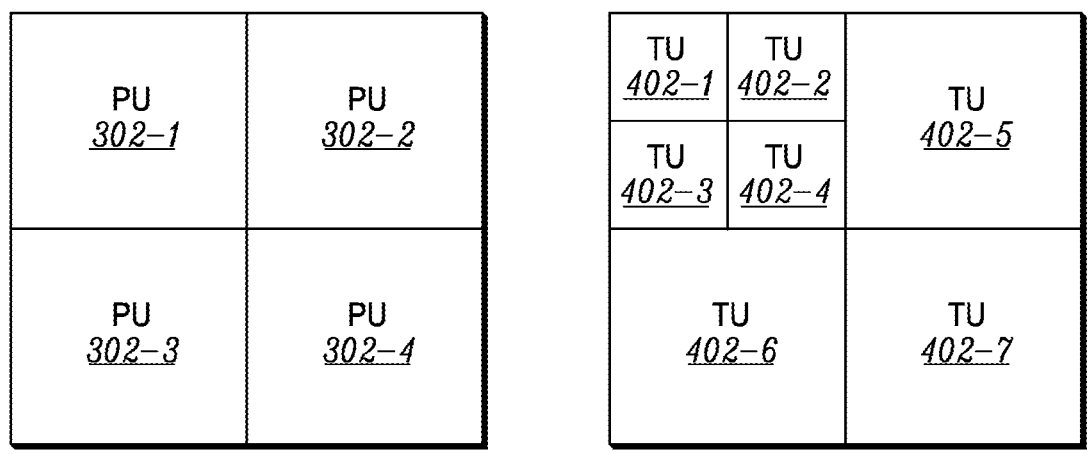
FIG. 4 illustrates a CU partitioned into PUs and a set of transform units (TU) associated with the CU.
Figure 5:
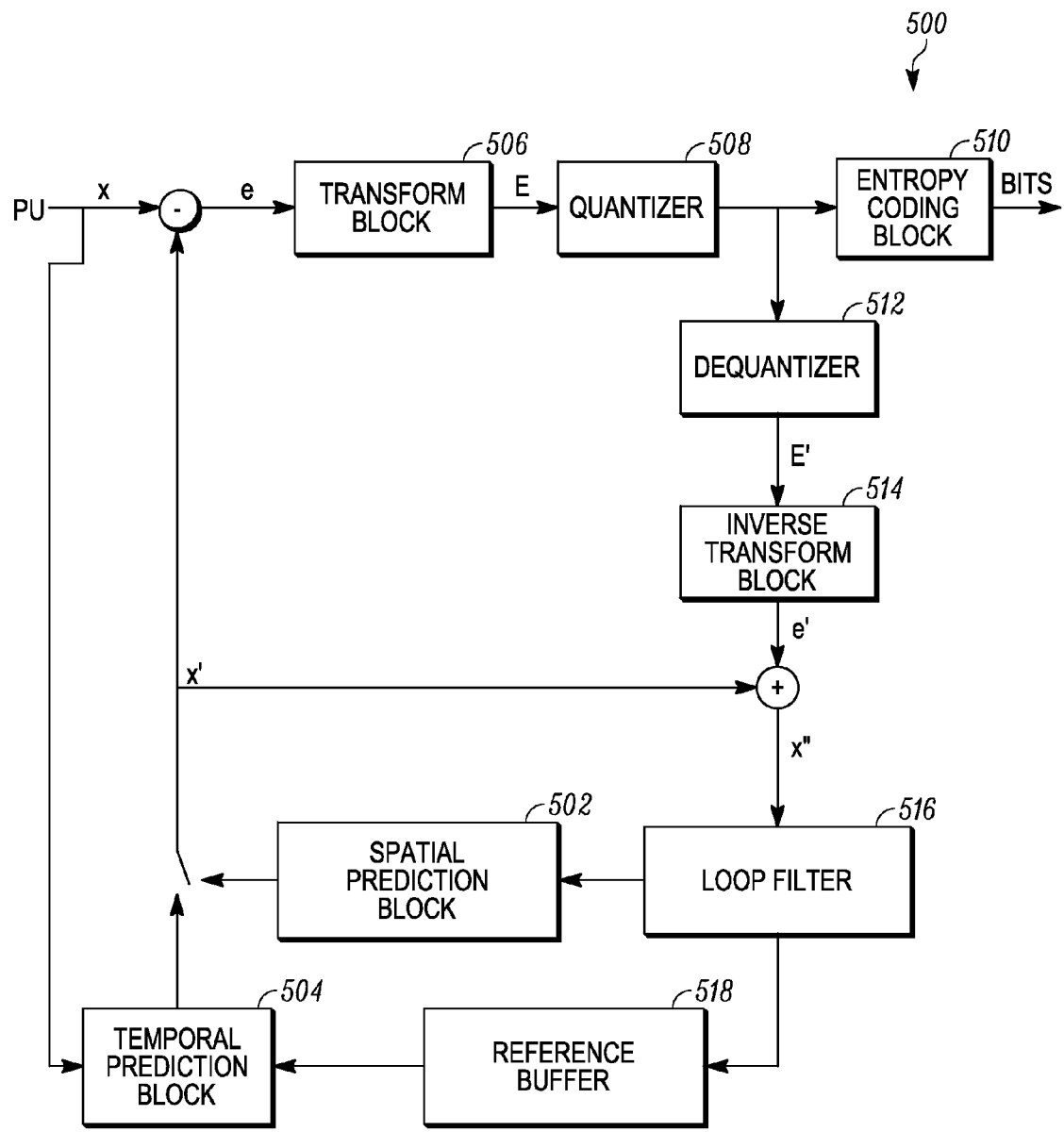
FIG. 5 illustrates an encoder for encoding video content.

FIG. 5 depicts an example encoder 500 for encoding video content. In one embodiment, encoder 500 can implement the HEVC standard. A general operation of encoder 500 is described below; however, it should be appreciated that this description is provided for illustration purposes only and is not intended to limit the disclosure and teachings herein. One of ordinary skill in the art will recognize various modifications, variations, and alternatives for the structure and operation of encoder 500.

As shown, encoder 500 receives as input a current PU "x." PU x corresponds to a CU (or a portion thereof), which is in turn a partition of an input picture (e.g., video frame) that is being encoded. Given PU x, a prediction PU "x'" is obtained through either spatial prediction or temporal prediction (via spatial prediction block 502 or temporal prediction block 504). PU x' is then subtracted from PU x to generate a residual PU "e."

Once generated, residual PU e is passed to a transform block 506, which is configured to perform one or more transform operations with respect to PU e. Examples of such transform operations include the discrete sine transform (DST), the discrete cosine transform (DCT), and variants thereof (e.g., DCT-I, DCT-II, DCT-III, etc.). Transform block 506 then outputs a transformed PU E for residual PU e, such that transformed PU E comprises a two-dimensional array of transform coefficients. As noted in the Background, PU e may be split into a number of TUs, and each TU may, in turn, be split into a number of color component-specific TUs (e.g., a luma TU, a chroma TU, etc.). In these cases, a transformed PU E may be generated at block 506 for color component-specific TU of PU e.

Transformed PU E is passed to a quantizer 508, which is configured to convert, or quantize, the relatively high precision transform coefficients of PU E into a finite number of possible values. After quantization, transformed PU E is entropy coded via entropy coding block 510. This entropy coding process compresses the quantized transform coefficients into final compression bits that are subsequently transmitted to an appropriate receiver/decoder. Entropy coding block 510 can use various different types of entropy coding schemes, such as CABAC. A particular embodiment of entropy coding block 510 that implements CABAC is described in further detail below.

In addition to the foregoing steps, encoder 500 includes a decoding process in which a dequantizer 512 dequantizes the quantized transform coefficients of PU E into a dequantized PU "E'." PU E' is passed to an inverse transform block 514, which is configured to inverse transform the de-quantized transform coefficients of PU E' and thereby generate a reconstructed residual PU "e'." Reconstructed residual PU e' is then added to the original prediction PU x' to form a new, reconstructed PU "x"." A loop filter 516 performs various operations on reconstructed PU x" to smooth block boundaries and minimize coding distortion between the reconstructed pixels and original pixels. Reconstructed PU x" is then used as a prediction PU for encoding future frames of the video content. For example, if reconstructed PU x" is part of a reference frame, reconstructed PU x" can be stored in a reference buffer 518 for future temporal prediction.

Figure 6:
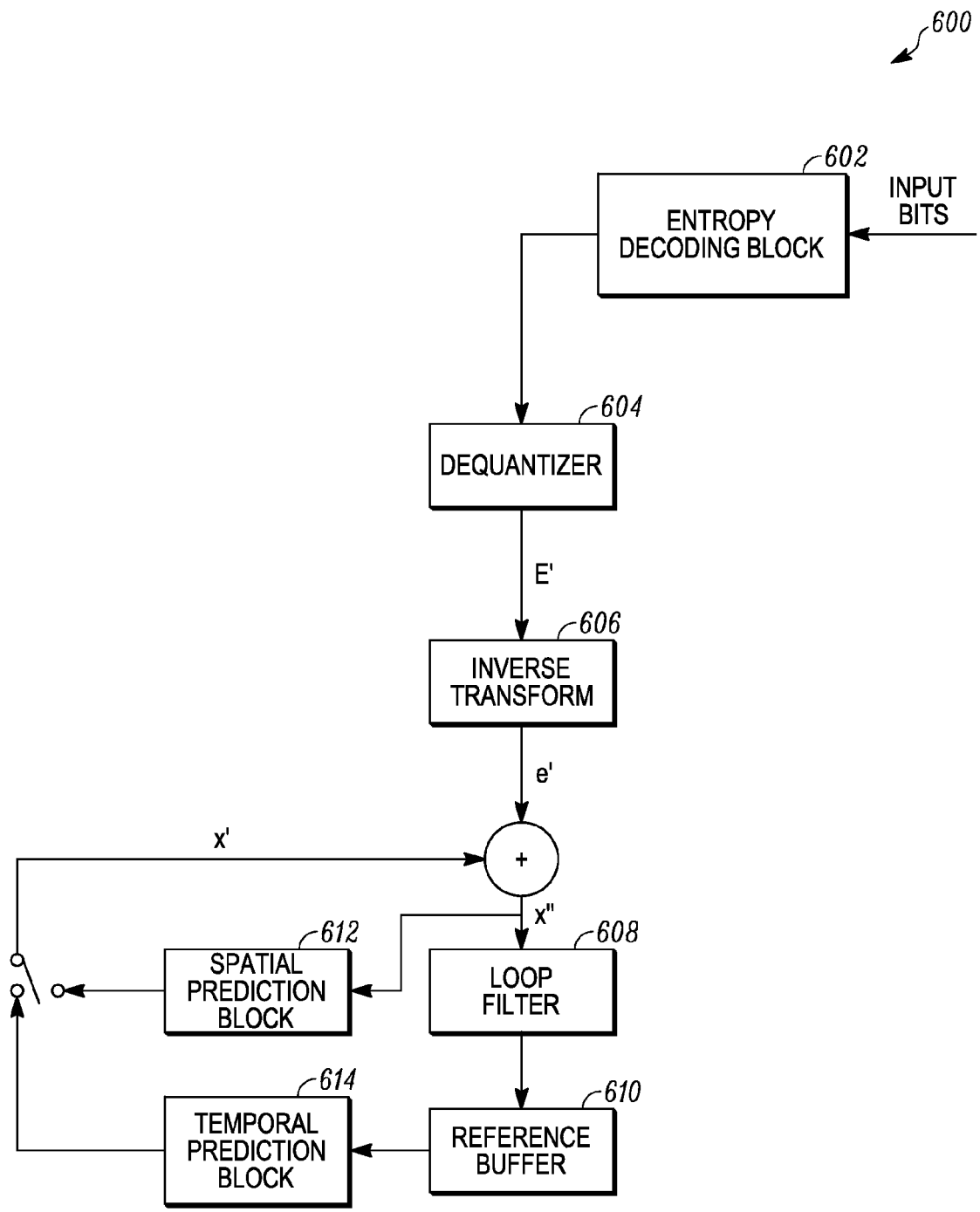
FIG. 6 illustrates a decoder for decoding video content.

FIG. 6 depicts an example decoder 600 that is complementary to encoder 500 of FIG. 5. Like encoder 500, in one embodiment, decoder 600 can implement the HEVC standard. A general operation of decoder 600 is described below; however, it should be appreciated that this description is provided for illustration purposes only and is not intended to limit the disclosure and teachings herein. One of ordinary skill in the art will recognize various modifications, variations, and alternatives for the structure and operation of decoder 600.

As shown, decoder 600 receives as input a bitstream of compressed data, such as the bitstream output by encoder 500. The input bitstream is passed to an entropy decoding block 602, which is configured to perform entropy decoding on the bitstream to generate quantized transform coefficients of a residual PU. In one embodiment, entropy decoding block 602 is configured to perform the inverse of the operations performed by entropy coding block 510 of encoder 500. Entropy decoding block 602 can use various different types of entropy coding schemes, such as CABAC. A particular embodiment of entropy decoding block 602 that implements CABAC is described in further detail below.

Once generated, the quantized transform coefficients are dequantized by dequantizer 604 to generate a residual PU "E'." PU E' is passed to an inverse transform block 606, which is configured to inverse transform the dequantized transform coefficients of PU E' and thereby output a reconstructed residual PU "e'." Reconstructed residual PU e' is then added to a previously decoded prediction PU x' to form a new, reconstructed PU "x"." A loop filter 608 perform various operations on reconstructed PU x" to smooth block boundaries and minimize coding distortion between the reconstructed pixels and original pixels. Reconstructed PU x" is then used to output a reconstructed video frame. In certain embodiments, if reconstructed PU x" is part of a reference frame, reconstructed PU x" can be stored in a reference buffer 610 for reconstruction of future PUs (via, e.g., spatial prediction block 612 or temporal prediction block 614).

CABAC Encoding/Decoding

As noted with respect to FIGS. 5 and 6, entropy coding block 510 and entropy decoding block 602 can each implement CABAC, which is an arithmetic coding scheme that maps symbols to/from a non-integer length (e.g., fractional) codeword. The efficiency of arithmetic coding depends to a significant extent on the determination of accurate probabilities for the input symbols. Thus, to improve coding efficiency, CABAC uses a context-adaptive technique in which different context models (i.e., probability models) are selected and applied to different syntax elements. Further, these context models can be updated during encoding/decoding.

Generally speaking, the process of encoding a syntax element using CABAC includes three elementary steps: (1) binarization, (2) context modeling, and (3) binary arithmetic coding. In the binarization step, the syntax element is converted into a binary sequence or bin string (if it is not already binary valued). In the context modeling step, a context model is selected (from a list of available models per the CABAC standard) for one or more bins (i.e., bits) of the bin string. The context model selection process can differ based on the particular syntax element being encoded, as well as the statistics of previously encoded bins. In the arithmetic coding step, each bin is encoded (via an arithmetic coder) based on the selected context model. The process of decoding a syntax element using CABAC corresponds to the inverse of these steps.

Figure 7:
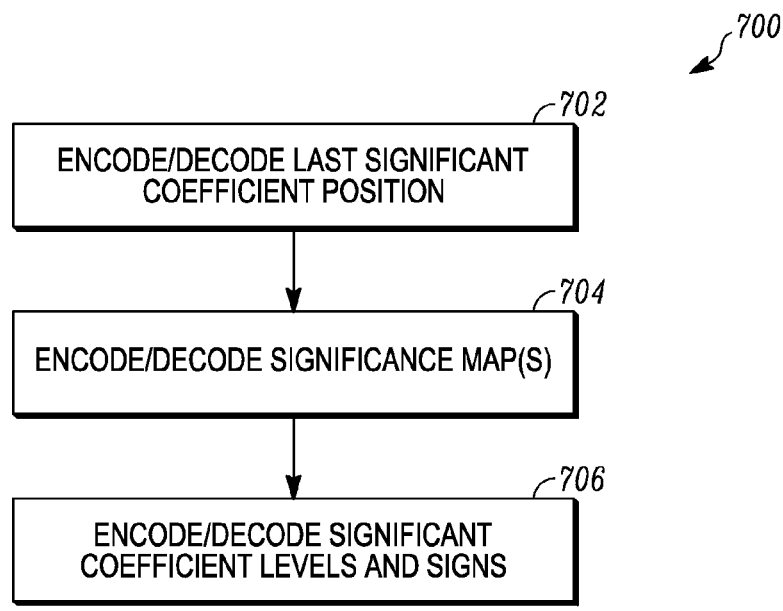
FIG. 7 illustrates a CABAC encoding/decoding process.

FIG. 7 depicts an exemplary CABAC encoding/decoding process 700 that is performed for encoding/decoding quantized transform coefficients of a residual PU (e.g., quantized PU E of FIG. 5). Process 700 can be performed by, e.g., entropy coding block 510 of FIG. 5 or entropy decoding block 602 of FIG. 6. In a particular embodiment, process 700 is applied to each TU associated with the residual PU. For example, process 700 can be applied to each TU corresponding to a specific color component (e.g., luma or chroma) of the residual PU.

At block 702, entropy coding block 510/entropy decoding block 602 encodes or decodes a last significant coefficient position that corresponds to the (y, x) coordinates of the last significant (i.e., non-zero) transform coefficient in the current TU (for a given scanning pattern). With respect to the encoding process, this includes binarizing a "last_significant_coeff_y" syntax element (corresponding to the y coordinate) and a "last_significant_coeff_x" syntax element (corresponding to the x coordinate), and then selecting a context model for each of the bins of these two syntax elements. Once a context model is selected, each of the bins of the last_significant_coeff_y and last_significant_coeff_x syntax elements are arithmetically encoded/decoded using the selected model.

At block 704, entropy coding block 510/entropy decoding block 602 encodes or decodes one or more binary significance maps associated with the current TU. Generally speaking, a significance map indicates the positions of non-zero transform coefficients in a TU (prior to the last significant coefficient position noted above). In the case of a "small" TU (e.g., smaller than 8×8 pixels in size), a single significance map is encoded/decoded, where each element of the single significance map (represented by the syntax element "significant_coeff_flag") is a binary value indicating whether the transform coefficient at the corresponding location in the TU is non-zero or not.

In the case of a "large" TU (e.g., equal to or greater than 8×8 pixels in size), two distinct significance maps are encoded/decoded: a sub-block-level (i.e., level one or "L1") significance map and a coefficient-level (i.e., level zero or "L0") significance map. Each element of the L1 significance map (represented by the syntax element "significant_coefgroup_flag") is a binary value indicating whether a sub-block at the corresponding location in the TU contains any non-zero transform coefficients. The size of these sub-blocks can be the same or vary based on the size of the TU. For one example, all TU sizes may be divided into 4×4 sub-blocks. For another example, a 16×16 TU may be divided into 4×4 sub-blocks, while a 32×32 TU may be divided into 8×8 sub-blocks.

Each element of the L0 significance map (represented by the syntax element "significant_coeff_flag") is a binary value indicating whether the transform coefficient at the corresponding location in the TU is non-zero or not. Thus, the L0 significance map can be substantially similar in function to the single significance map used in the small TU scenario.

As part of the processing at block 704, entropy coding block 510/entropy decoding block 602 selects context models for encoding/decoding significance values of the sub-blocks (in the case of an L1 significance map) and/or the transform coefficients (in the case of an L0 or small TU significance map) of the current TU. In certain CABAC implementations, the manner in which these context models are selected, as well as the context models themselves, will vary based upon the color component to which the current TU corresponds (e.g., luma or chroma). For instance, if the current TU is a large luma TU, entropy coding block 510/entropy decoding block 602 will use context derivation processes and context models for L1 and L0 significance map encoding/decoding that are specific to the luma component. On the other hand, if the current TU is a large chroma TU, block 510/block 602 will use context derivation processes and context models for L1 and L0 significance map encoding/decoding that are specific to the chroma component. This color component-specific context selection is described in greater detail with respect to FIG. 8 below.

After the significance map(s) for the current TU are encoded/decoded, block 510/block 602 encodes or decodes the significant transform coefficients of the current TU (block 706). This process includes, for each significant transform coefficient, selecting context models for syntax elements associated with the absolute level and sign of the coefficient, and then arithmetically encoding/decoding the syntax elements using the selected models. The output from block 706 represents entropy encoded/decoded data that can be passed to the next component in the encoder or decoder component chain.

Figure 8:
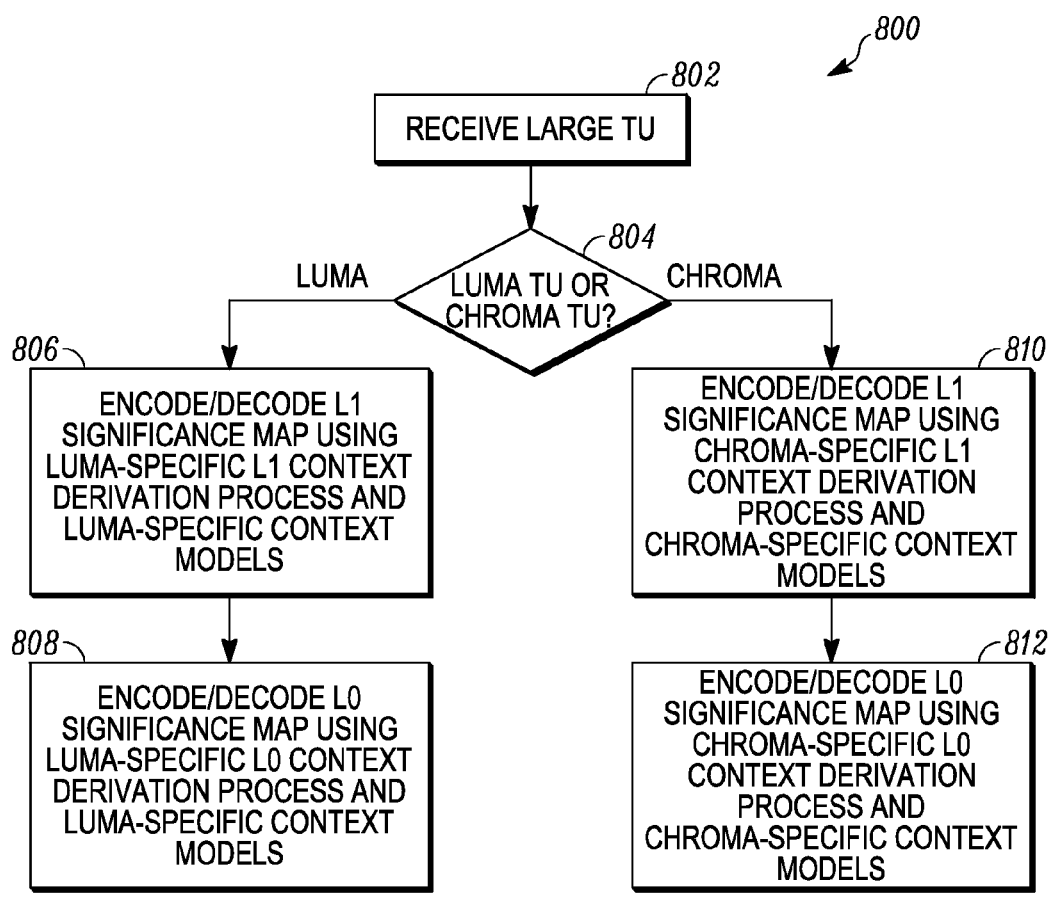
FIG. 8 illustrates an L1/L0 significance map encoding/decoding process.

As noted above, in certain implementations of CABAC, the process of selecting context models for encoding/decoding L1 and L0 significance maps for a large TU will differ depending on the color component to which the TU corresponds (e.g., luma or chroma). FIG. 8 depicts a process 800 (performed in the context of block 704) that illustrates this.

At block 802, a large TU (e.g., a TU equal to or greater than 8×8) is received. At block 804, entropy coding block 510/entropy decoding block 602 determines whether the current TU is a luma TU (i.e., corresponds to the luma component of the input video data) or a chroma TU (i.e., corresponds to a chroma component of the input video data).

Figure 9:
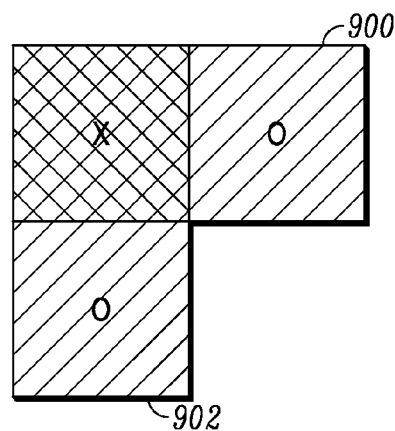
FIG. 9 illustrates a two neighbor scheme for context selection during L1 significance map encoding/decoding.

If the current TU is a luma TU, entropy coding block 510/entropy decoding block 602 encodes/decodes an L1 significance map for the TU using an L1 context derivation process and a set of context models that are specific to the luma color component (block 806). In particular, for each sub-block in the TU, entropy coding block 510/entropy decoding block 602 inspects the L1 significance values of neighbor sub-blocks to the immediate right and bottom of the sub-block. Examples of these neighbor sub-blocks are shown in FIG. 9 as 900 and 902. Entropy coding block 510/entropy decoding block 602 then selects a luma-specific context model for the sub-block based on the neighbor significance values, and arithmetically encodes or decodes the significance value for the sub-block (i.e., the significant_coeffgroup_flag) using the selected model.

Figure 10:
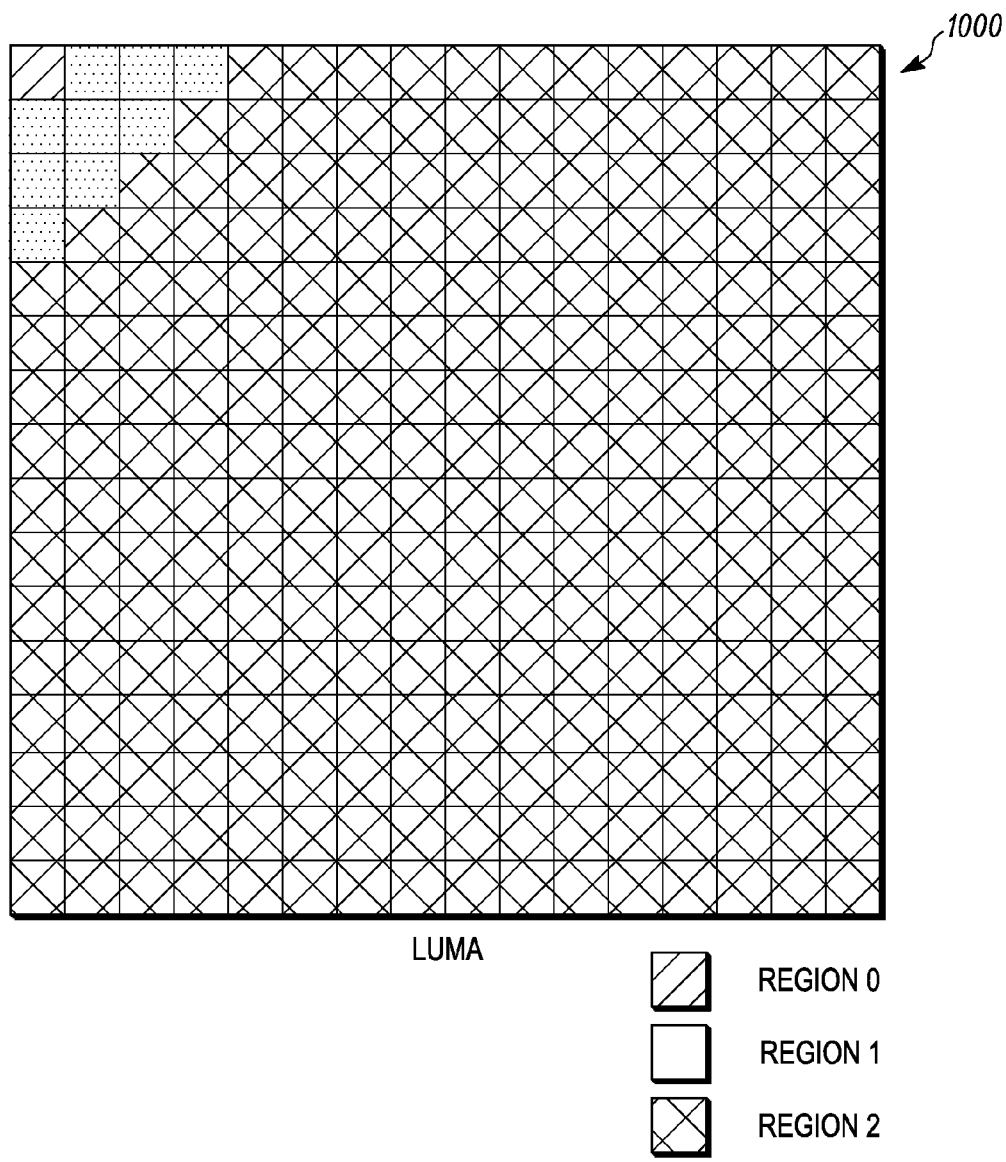
FIG. 10 illustrates a TU partitioned into three regions.

The specific context selection logic performed at block 806 is provided below:
1. For each sub-block the luma TU:
   a. If neither the right neighbor sub-block nor the bottom neighbor sub-block contains any non-zero transform coefficients, select a first (luma-specific) context model for the current sub-block
   b. If either the right neighbor sub-block or the bottom neighbor sub-block of the current sub-block contains any non-zero transform coefficients, select a second (luma-specific) context model for the current sub-block Once the L1 significance map for the luma TU has been encoded or decoded, entropy coding block 510/entropy decoding block 602 encodes/decodes an L0 significance map for the luma TU using an L0 context derivation process and a set of context models that are specific to the luma color component (block 808). In particular, entropy coding block 510/entropy decoding block 602 divides the luma TU into three distinct regions—0, 1, and 2. Region 0 includes the DC coefficient of the TU (i.e., the transform coefficient in the upper left corner), region 1 includes a number of transform coefficients to the lower right of the DC coefficient, and region 2 includes the remaining transform coefficients in the TU. FIG. 10 illustrates these three regions in an example luma TU 1000. The threshold for partitioning region 1 and region 2 can be determined based on the size of the TU or based on number of pixels. For one example, in a particular embodiment, the threshold can equal TU size>>2. For another example, in another embodiment, the threshold can equal to the transform coefficients corresponding to the 4 lowest frequency components in both horizontal and vertical directions.

After partitioning the TU into regions 0, 1, and 2, entropy coding block 510/entropy decoding block 602 applies certain context model selection rules to each transform coefficient in the luma TU based on the region in which the coefficient is located. For example, if the transform coefficient is in region 0, entropy coding block 510/entropy decoding block 602 selects a luma-specific "region 0" context model. On the other hand, if the transform coefficient is in region 1 or 2, entropy coding block 510/entropy decoding block 602 selects one of several luma-specific context models based on the L0 significance values of either four neighbors (shown as 1100, 1102, 1104, and 1106 in FIG. 11) or five neighbors (shown as 1200, 1202, 1204, 1206, and 1208 in FIG. 12) around the transform coefficient. Entropy coding block 510/entropy decoding block 602 then arithmetically encodes/decodes the L0 significance value (i.e., the significant_coeff_flag) of the transform coefficient using the selected model.

Figure 11:
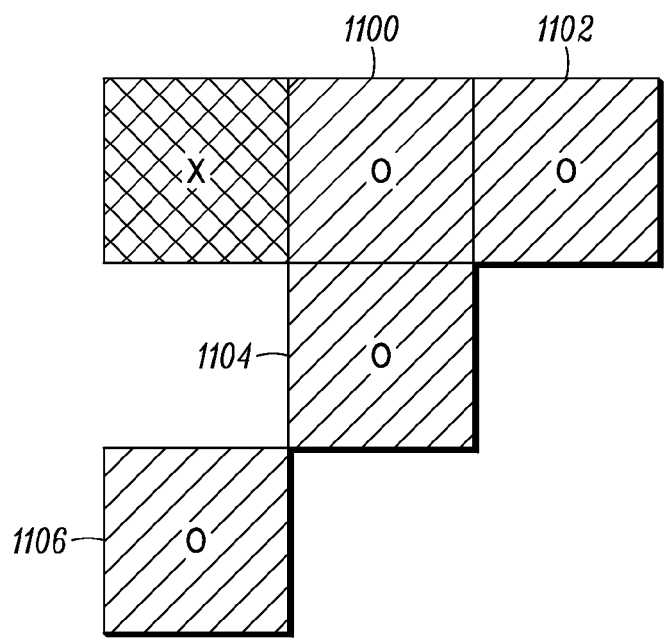
FIG. 11 illustrates a four neighbor scheme for context selection during L0 significance map encoding/decoding.
Figure 12:
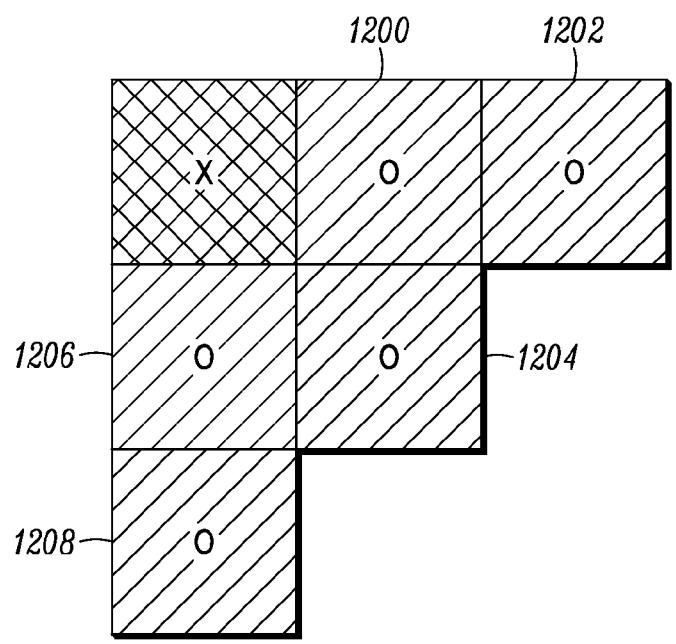
FIG. 12 illustrates a five neighbor scheme for context selection during L0 significance map encoding/decoding.
Figure 13:
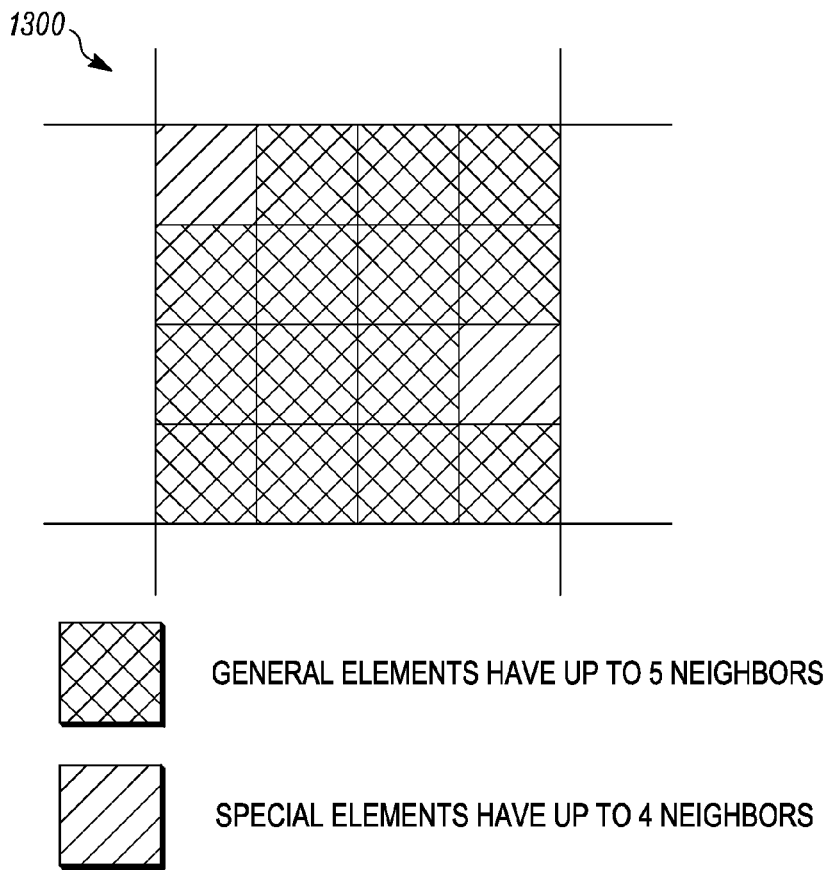
FIG. 13 illustrates the positions of special and general coefficients in a sub-block.

The determination of whether to use the four neighbor scheme of FIG. 11 or the five neighbor scheme of FIG. 12 is dependent on the position of the transform coefficient within its sub-block. In a particular embodiment, transform coefficients that are located in the top-left corner of a sub-block or immediately above the right bottom-corner of a sub-block are considered "special" coefficients that derive their context models based on the four neighbor scheme. All other elements in the sub-block are considered "general" coefficients that derive their context models based on the five neighbor scheme. To illustrate this, FIG. 13 depicts an example sub-block 1300 and indicates the locations of the special and general coefficients within sub-block 1300.

The specific context derivation logic performed at block 808 is provided below:
1. For each sub-block in the luma TU that has a non-zero significance value in the L1 significance map:
   a. For each transform coefficient in the current sub-block:
      i. If the current transform coefficient is in region 0, select a first context model for the transform coefficient
      ii. If the current transform coefficient is in region 1:
         1. Determine size of neighborhood (4 or 5 neighbors) based on the position of the current transform coefficient in the current sub-block—if the current transform coefficient is in the upper-left corner or immediately above the bottom-right corner of the sub-block, use 4 neighbors, otherwise use 5 neighbors
         2. If there are no non-zero transform coefficients in the neighborhood, select a second context model for the transform coefficient
         3. If there are one or two non-zero transform coefficients in the neighborhood, select a third context model for the transform coefficient
         4. If there are more than three non-zero transform coefficients in the neighborhood, select a fourth context model for the transform coefficient
      iii. If the current transform coefficient is in region 2:
         1. Determine size of neighborhood (4 or 5 neighbors) based on the position of the current transform coefficient in the current sub-block—if the current transform coefficient is in the upper-left corner or immediately above the bottom-right corner of the sub-block, use 4 neighbors, otherwise use 5 neighbors 2. If there are no non-zero transform coefficients in the neighborhood, select a fifth context model for the transform coefficient 3. If there are one or two non-zero transform coefficients in the neighborhood, select a sixth context model for the transform coefficient 4. If there are more than three non-zero transform coefficients in the neighborhood, select a seventh context model for the transform coefficient Returning to block 804, if the current TU is determined to be a chroma TU (rather than a luma TU), encodes/decodes an L1 significance map for the TU using an L1 context derivation process and a set of context models that are specific to the chroma color component (block 810). In one embodiment, the context selection logic used at block 810 is similar to the logic used at block 806 (e.g., the context model for a particular sub-block selected is based on the L1 significance values of the right and bottom neighbor sub-blocks). However, the context models that are selected at block 810 apply only to chroma TUs, and thus are different from the luma-specific context models selected at block 806.

The specific context selection logic performed at block 810 is provided below:

1. For each sub-block in the chroma TU:
   a. If neither the right neighbor sub-block nor the bottom neighbor sub-block contains any non-zero transform coefficients, select a first (chroma-specific) context model for the current sub-block
   b. If either the right neighbor sub-block or the bottom neighbor sub-block of the current sub-block contains any non-zero transform coefficients, select a second (chroma-specific) context model for the current sub-block Once the L1 significance map for the chroma TU has been encoded/decoded, entropy coding block 510/entropy decoding block 602 encodes/decodes an L0 significance map for the chroma TU using an L0 context derivation process and a set of context models that are specific to the chroma color component (block 812). For example, unlike the luma-specific process used at block 808, the chroma-specific L0 context derivation process divides the chroma TU into two (rather than three) distinct regions 0 and 1. Region 0 includes the DC coefficient of the TU and region 1 includes the remaining transform coefficients in the TU.

After partitioning the chroma TU into regions 0 and 1, entropy coding block 510/entropy decoding block 602 applies certain context model selection rules to each transform coefficient in the TU based on the region in which the coefficient is located. In one embodiment, these rules are similar to the rules described with respect to block 808 (e.g., if in region 0, selected a predetermined "region 0" context model, otherwise select one of three other context models depending on whether the transform coefficient is a special or general coefficient within its sub-block). However, the context models that are selected at block 812 apply only to chroma TUs, and thus are different from the luma-specific context models selected at block 808.

The specific context derivation logic performed at block 812 is provided below:

1. For each sub-block in the chroma TU that has a non-zero significance value in the L1 significance map:
   a. For each transform coefficient in the current sub-block:
      i. If the current transform coefficient is in region 0, select a first (chroma-specific) context model for the transform coefficient
      ii. If the current transform coefficient is in region 1:
         1. Determine size of neighborhood (4 or 5 neighbors) based on the position of the current transform coefficient in the current sub-block—if the current transform coefficient is in the upper-left corner or immediately above the bottom-right corner of the sub-block, use 4 neighbors, otherwise use 5 neighbors
         2. If there are no non-zero transform coefficients in the neighborhood, select a second (chroma-specific) context model for the transform coefficient
         3. If there are one or two non-zero transform coefficients in the neighborhood, select a third (chroma-specific) context model for the transform coefficient
         4. If there are more than three non-zero transform coefficients in the neighborhood, select a fourth (chroma-specific) context model for the transform coefficient As can be seen from FIG. 8 and its accompanying description, the process of encoding/decoding L1 and L0 significance maps for large TUs using CABAC can be complex. For L1 significance map encoding/decoding, four distinct context models are used (two for luma, two for chroma). Further, for L0 significance map encoding/decoding, eleven distinct context models are used (seven for luma, four for chroma), and the context selection process requires luma or chroma-specific logic for region partitioning and neighborhood determination. The following section describes various enhancements that simplify context model selection when encoding/decoding L1 and L0 significance maps using CABAC.

CABAC Encoding/Decoding of Significance Maps Using Simplified Context Model Selection In one set of embodiments, the encoding/decoding of L0 and L1 significance maps shown in FIG. 8 can be modified such that a common set of context derivation processes and a common set of context models are used for both luma and chroma TUs. This avoids the need to maintain luma-specific and chroma-specific context models, and unifies the program code/hardware logic needed to implement luma and chroma significance map coding.

In another set of embodiments, the region partitioning performed during L0 significance map coding can be simplified such that the same approach to partition a TU is used for both luma and chroma TUs. For instance, two regions (0 and 1) can be used for both luma and chroma TUs. Region 0 can comprise the DC coefficient in a TU and region 1 can comprise the remaining transform coefficients in the TU. In the luma context, this eliminates the need to distinguish between, and implement separate logic for, regions 1 and 2.

In yet another set of embodiments, a common neighbor context selection scheme can be used for all transform coefficients in region 1 of a luma or chroma TU. This avoids the need to differentiate between special and general coefficient positions in a sub-block and assign different neighborhood sizes (e.g., four or five neighbors) based on those positions. Any number of neighbors and any number of context models can be used in this common context selection scheme.

In yet another set of embodiments, the specific logic to select context models for a transform coefficient in region 1 can depend on an allowed maximum number of context models (n). For example, for a given transform coefficient, if there are i non-zero transform coefficients in the neighborhood of and i<(n−1), the $i^{th}$ context model can be selected; otherwise, the $(n-1)^{th}$ context model can be selected.

In one embodiment, each of the foregoing simplification techniques can apply solely to large TUs. In other embodiments, each of the foregoing techniques can apply to TUs of all sizes.

Figure 14:
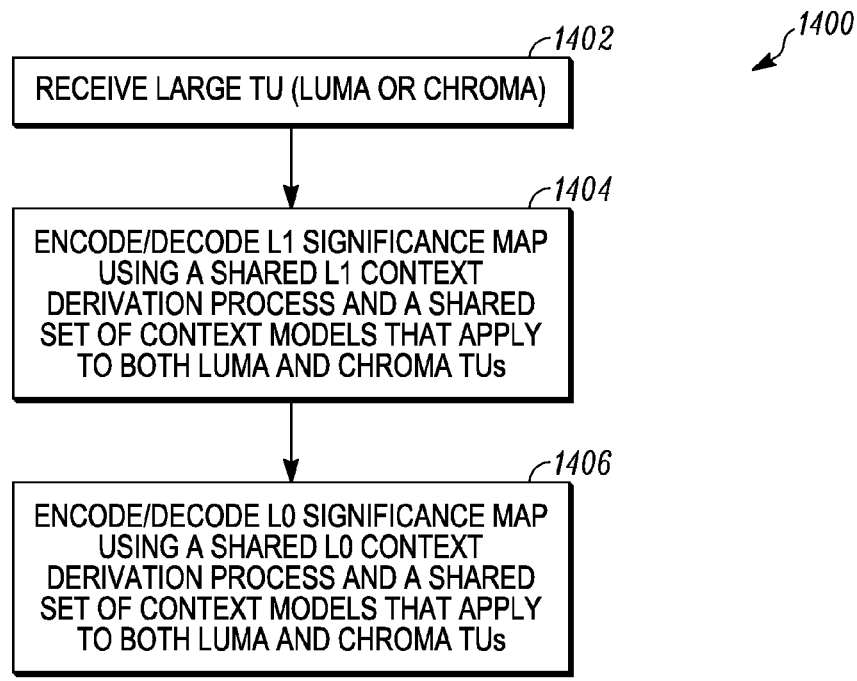
FIG. 14 illustrates a process for L1/L0 significance map encoding/decoding using simplified context selection according to one embodiment.

FIG. 14 depicts a process 1400 for carrying out L1 and L0 significance map encoding/decoding in CABAC using simplified context selection according to one embodiment. Process 1400 can be executed by entropy coding block 510 or entropy decoding block 602 within block 704 of FIG. 7. In one embodiment, process 1400 can be executed in lieu of process 800 of FIG. 8.

At block 1402, a large TU (either luma or chroma) can be received. In certain embodiments, a large TU can be considered any TU that consists of multiple 4×4 sub-blocks. In other embodiments, a large TU can be considered any TU that fits within a set of sizes that includes, e.g., 8×8, 16×16, 32×32, 4×16, 16×4, 8×32, and 32×8.

At block 1404, entropy coding block 510/entropy decoding block 602 can encode/decode an L1 (i.e., sub-block-level) significance map for the TU received at block 1402 using a shared L1 context derivation process and a shared set of L1 context models that apply to both luma and chroma components. Thus, with this approach, the same context derivation logic, and the same context models, can be used for encoding/decoding L1 significance values of both luma and chroma TUs.

In a particular embodiment, the shared L1 context derivation process used at block 1404 can be similar to the L1 context derivation processes described with respect to blocks 806 and 810 of FIG. 8. For example, the shared L1 context derivation process can select a context model for a sub-block of the TU based on the L1 significance values of the immediate right and bottom neighbor sub-blocks. However, unlike the luma and chroma-specific L1 context derivation processes of blocks 806 and 810, the shared L1 context derivation process of block 1404 can use the same two context models for both luma and chroma TUs. Thus, the total number of context models needed for L1 significance map coding can be reduced from four to two.

The specific context derivation logic that can be performed at block 1404 is provided below:
1. For each sub-block the TU:
   a. If neither the right neighbor sub-block nor the bottom neighbor sub-block contains any non-zero transform coefficients, select a first context model for the current sub-block
   b. If either the right neighbor sub-block or the bottom neighbor sub-block of the current sub-block contains any non-zero transform coefficients, select a second context model for the current sub-block Once the L1 significance map has been encoded/decoded, entropy coding block 510/entropy decoding block 602 can encode/decode an L0 (i.e., coefficient-level) significance map for the TU received at block using a shared L0 context derivation process and a shared set of L0 context models that apply to both luma and chroma components (block 1406). Thus, with this approach, the same context derivation logic, and the same context models, can be used for encoding/decoding L0 significance values of both luma and chroma TUs.

Figure 15:
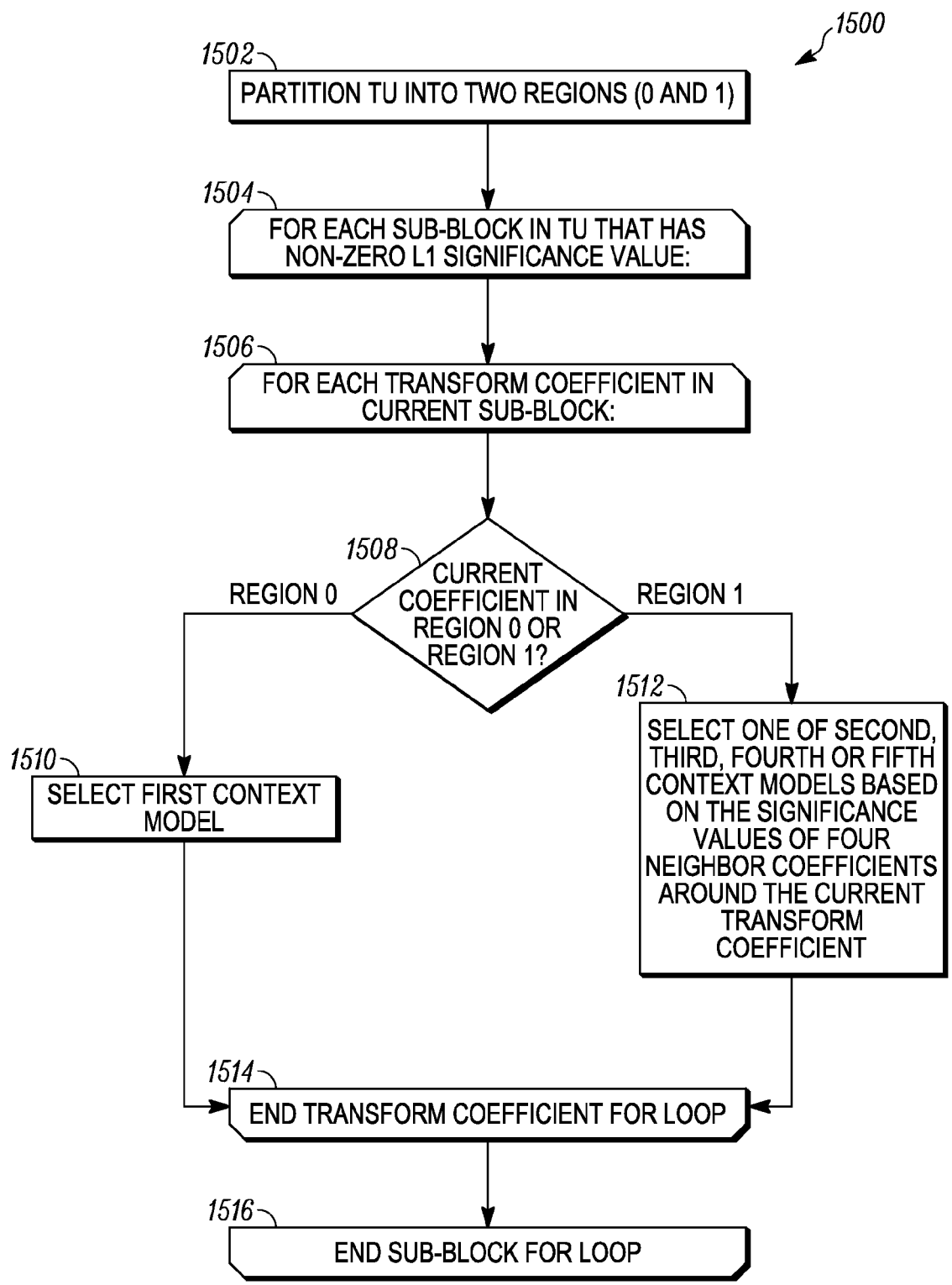
FIG. 15 illustrates a process for simplified context selection during L0 significance map encoding/decoding according to one embodiment.
Figure 16:
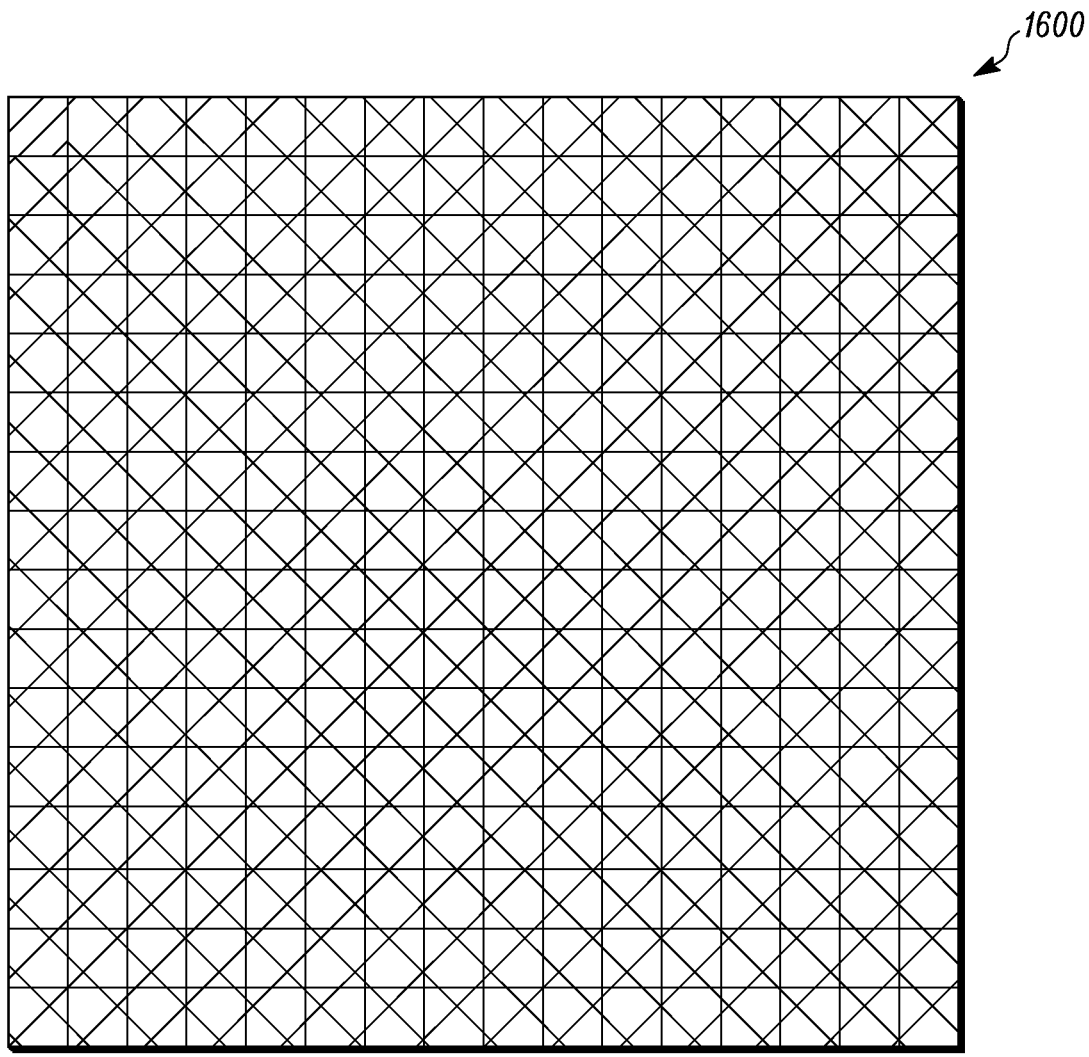
FIG. 16 illustrates a TU partitioned into two regions according to one embodiment.
Figure 16:

FIG. 15 depicts a process 1500 that illustrates how the shared L0 context derivation process of block 1406 can be implemented. In one embodiment, process 1500 represents a simplified version of the L0 context derivation processes described with respect to blocks 808 and 812 of FIG. 8. At block 1502, the TU received at block 1402 can be partitioned into two distinct regions 0 and 1. Region 0 can include the DC coefficient of the TU and region 1 can include the remaining transform coefficients in the TU. FIG. 16 illustrates these two regions in an example (luma or chroma) TU 1600.

At block 1504, entropy coding block 510/entropy decoding block 602 can enter an outer FOR loop for each sub-block in the TU that has a non-zero L1 significance value. And at block 1506, entropy coding block 510/entropy decoding block 602 can enter an inner FOR loop for each transform coefficient in the current sub-block.

Within the inner FOR loop of block 1506, entropy coding block 510/entropy decoding block 602 can determine whether the current transform coefficient is in region 0 or region 1 of the TU (block 1508). If the current transform coefficient is in region 0, entropy coding block 510/entropy decoding block 602 can select a first context model for the transform coefficient (block 1510). This first context model can be identical for both luma and chroma TUs.

If the current transform coefficient is in region 1, entropy coding block 510/entropy decoding block 602 can select one of a plurality of context models for the transform coefficient based on the significance values of one or more neighbor coefficients around the current transform coefficient (block 1512). The same concept can be applied to the other regions if more than two regions are allowed. In a particular embodiment, entropy coding block 510/entropy decoding block 602 can select one of four context models per region (e.g., second, third, fourth, and fifth context models) based on a neighborhood of four coefficients (such as the neighborhood shown in FIG. 11). In other embodiments, other numbers of context models and other numbers of neighbors can be supported. Like the first context model, the plurality of context models that are used for selection at block 602 can be identical for both luma and chroma TUs.

One embodiment of the logic for selecting one of four context models (e.g., second, third, fourth, or fifth context models) at block 1512 can proceed as follows:
1. If there are no non-zero transform coefficients in the neighborhood, select the second context model
2. If there is one non-zero transform coefficients in the neighborhood, select the third context model
3. If there are two non-zero transform coefficients in the neighborhood, select the fourth context model
4. If there are more than two non-zero transform coefficients in the neighborhood, select the fifth context model In another embodiment, the logic for selecting one of three context models (e.g., second, third, or fourth context models) at block 1512 can proceed as follows:
1. If there are no non-zero transform coefficients in the neighborhood, select the second context model
2. If there is one non-zero transform coefficients in the neighborhood, select the third context model
3. If there are greater than one non-zero transform coefficients in the neighborhood, select the fourth context model At block 1514, the inner FOR loop initiated at block 1506 can end (once all transform coefficients in the current sub-block are traversed). Finally, at block 1516, the outer FOR loop initiated at block 1504 can end (once all sub-blocks in the TU that have a non-zero L1 significance value are traversed).

It should be noted that since the context models selected in process 1500 are shared between luma and chroma TUs, total number of context models needed are reduced by half compared to the luma-specific and chroma-specific L0 context derivation processes performed at blocks 808 and 812 of FIG. 8. In addition, since only a single neighborhood (e.g., the four neighbor scheme shown in FIG. 11) is used to select context models for transform coefficients in region 1, the complexities resulting from selecting different neighborhoods based on the locations of transform coefficients within their respective sub-blocks (as described with respect to blocks 808 and 812) are avoided.

In summary, the techniques described above can simplify L0/L1 significance map encoding/decoding for large luma and chroma TUs in at least three ways:

1. Common L1/L0 context derivation processes and common sets of context models are used for both luma and chroma TUs
2. Two regions 0 and 1 (with only the DC coefficient in region 0) are used for L0 context selection, thereby eliminating region 1/2 processing
3. A common four neighbor scheme is used for transform coefficients in region 1 of a TU, thereby eliminating the need to check for special coefficient positions within a sub-block and to switch between different neighbor schemes With these enhancements, CABAC encoding/decoding implementations can be streamlined, and thus encoding/decoding performance can be improved.

Example Code

The following sections provide example code and data for implementing the simplified L1/L0 significance map encoding/decoding described with respect to FIGS. 14 and 15 according to one embodiment. This code/data is provided for illustration purposes only and should not be construed as limiting the embodiments described herein.

Shared Context Derivation Process for L1 Significance Map (significant_coeffgroup_flag Syntax Element)

The inputs to this process include the current coefficient group (i.e., sub-block) scan position (xCG, yCG), the previously decoded bins of the syntax element significant_coeffgroup_flag, the width of the current transform unit (log 2TrafoWidth), and the height of the current transform unit (log 2TrafoHeight). The output of this process is ctxIdxInc, which corresponds to the context index increment for selecting the context model for the current coefficient group/sub-block.

ctxIdxInc is initialized with 0 as follows.

ctxIdxInc=0

When xCG is less than (1>>(log 2TrafoWidth-2))-1, ctxIdxInc is modified as follows:

ctxIdxInc+=significant_coeffgroup_flag[xCG+1] [yCG]

When yCG is less than (1<<(log 2TrafoHeight-2))-1, ctxIdxInc is modified as follows:

ctxIdxInc+=significant_coeffgroup_flag[xCG] [yCG+1]

Shared Context Derivation Process for L0 Significance Map (significant_coeff_flag Syntax Element)

The inputs to this process are the color component index cIdx, the current transform coefficient scan position (xC, yC), the transform unit width (log 2TrafoWidth), and the transform unit height (log 2TrafoHeight). The output of this process is ctxIdxInc, corresponds to the context index increment for selecting the context model for the current transform coefficient.

The variable sigCtx depends on the current position (xC, yC), cIdx, the transform unit size, and previously encoded/decoded bins of the syntax element significant_coeff_flag. For the derivation of sigCtx, the following applies.

If log 2TrafoWidth is equal to log 2TrafoHeight and log 2TrafoWidth is equal to 2, sigCtx is derived using ctxIdxMap4x4[ ] specified in Table 1 as follows:

sigCtx=ctxIdxMap4x4[((cIdx>0) ? 15:0)+(yC<<2)+xC]

Otherwise if log 2TrafoWidth is equal to log 2TrafoHeight and log 2TrafoWidth is equal to 3, sigCtx is derived using ctxIdxMap8x8[ ] specified in Table 2 as follows:

sigCtx=((xC+yC)==0) ? 10: ctxIdxMap8x8[((yC>>1)<<2)+(xC>>1)]

sigCtx+=(cIdx>0) ? 6:9

Otherwise if xC+yC is equal to 0, sigCtx is derived as follows:

sigCtx=20

Otherwise (xC+yC is greater than 0), sigCtx is derived using previously encoded/decoded bins of the syntax element significant_coeff_flag as follows:

The variable sigCtx is initialized as follows.

sigCtx=0

When xC is less than (1<<log 2TrafoWidth)-1, the following applies:

sigCtx=sigCtx+significant_coeff_flag[xC+1] [yC]

When xC is less than (1<<log 2TrafoWidth)-1 and yC is less than (1<<log 2TrafoHeight)-1, the following applies:

sigCtx=sigCtx+significant_coeff_flag[xC+1] [yC+1]

When xC is less than (1<<log 2Width)-2, the following applies:

sigCtx=sigCtx+significant_coeff_flag[xC+2] [yC]

When yC is less than (1<<log 2TrafoHeight)-2 and sigCtx is less than 4, the following applies:

sigCtx=sigCtx+significant_coeff_flag[xC] [yC+2]

The variable sigCtx is modified as follows:

sigCtx=21+min(3, sigCtx)

The context index increment ctxIdxInc is derived using the color component index cIdx and sigCtx as follows:

If cIdx is equal to 0 or max(log 2TrafoWidth, log 2TrafoHeight)>3, ctxIdxInc is derived as follows:

ctxIdxInc=sigCtx

Otherwise (cIdx is greater than 0), ctxIdxInc is derived as follows:

ctxIdxInc=25+sigCtx

TABLE 1

Specification of ctxIdxMap4x4[i]

| i | 0 | 1 | 2 | 3 | 4 | 5 | 6 | 7 | 8 | 9 | 10 | 11 | 12 | 13 | 14 |
|---|---|---|---|---|---|---|---|---|---|---|----|----|----|----|----|
| ctxIdxMap4x4[i] | 0 | 1 | 4 | 5 | 2 | 3 | 4 | 5 | 6 | 6 | 8 | 8 | 7 | 7 | 8 |
| i | 15 | 16 | 17 | 18 | 19 | 20 | 21 | 22 | 23 | 24 | 25 | 26 | 27 | 28 | 29 |
| ctxIdxMap4x4[i] | 0 | 1 | 2 | 4 | 1 | 1 | 2 | 4 | 3 | 3 | 5 | 5 | 4 | 4 | 5 |

TABLE 2

Specification of ctxIdxMap8x8[i]

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| ctxIdxMap8x8[i] | 0 | 1 | 2 | 3 | 4 | 5 | 6 | 3 | 8 | 6 | 6 | 7 | 9 | 9 | 7 | 7 |

Particular embodiments may be implemented in a non-transitory computer-readable storage medium for use by or in connection with an instruction execution system, apparatus, device, or machine. For example, the non-transitory computer-readable storage medium can contain program code or instructions for controlling a computer system/device to perform a method described by particular embodiments. The program code, when executed by one or more processors of the computer system/device, can be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for encoding video data comprising:
   receiving, by a computing device, an array of transform coefficients corresponding to a luma component or a chroma component of the video data;
   selecting, by the computing device, using a shared L1 context derivation process that applies to both the luma component and the chroma component, L1 context models wherein the L1 context models are selected from a shared set of L1 context models that apply to both the luma component and the chroma component and the selecting includes, for each sub-block in the array:
   determining a significance value of a right neighbor sub-block of the sub-block and a significance value of a bottom neighbor sub-block of the sub-block, and
   selecting one of a first L1 context model or a second L1 context model for encoding the significance value of the sub-block based only on the significance value of the right neighbor sub-block and the significance value of the bottom neighbor sub-block of the sub-block, wherein the first L1 context model is selected if neither the significance value of the right neighbor sub-block nor the significance value of the bottom neighbor sub-block is equal to one and the second L1 context model is selected if the significance value of the right neighbor sub-block or the significance value of the bottom neighbor sub-block is equal to one;
   encoding, by the computing device, an L1 significance map that includes L1 significance values for sub-blocks in the array using the context models;
   selecting, by the computing device, using a shared L0 context derivation process that applies to both the luma component and the chroma component, L0 context models wherein the L0 context models are selected from a shared set of L0 context models that apply to both the luma component and the chroma component and the selecting includes, for each sub-block in the array:
   partitioning the array into a first region and a second region using a shared partitioning process, wherein the first region comprises a DC coefficient of the array and the second region comprises transform coefficients in the array other than the DC coefficient,
   selecting, for each sub-block having a non-zero significance value, when the sub-block is in the first region, a first L0 context model for encoding the significance value of the transform coefficients of the sub-block,
   selecting, for each sub-block having a non-zero significance value, when the sub-block is in the second region, one of a second L0 context model, a third L0 context model, a fourth L0 context model or a fifth L0 context model for encoding the significance value of a transform coefficient of the sub-block having a non-zero significance value based on significance values of four neighbor transform coefficients, wherein the second L0 context model is selected if there are no non-zero significance values among the four neighbor transform coefficients, the third L0 context model is selected if there is one non-zero significance value among the four neighbor transform coefficients, the fourth L0 context model is selected if there are two non-zero significance values among the four neighbor transform coefficients, and the fifth L0 context model is selected if there are more than two non-zero significance value among the four neighbor transform coefficients; and encoding, by the computing device, an L0 significance map that includes L0 significance values for sub-blocks in the array using the L0 context models.

2. A method for decoding video data comprising:

receiving, by a computing device, a bitstream of compressed data, the compressed data including an array of transform coefficients that was previously encoded, the array corresponding to a luma component or a chroma component of the video data;

selecting, by the computing device, using a shared L1 context derivation process that applies to both the luma component and the chroma component, L1 context models wherein the L1 context models are selected from a shared set of L1 context models that apply to both the luma component and the chroma component and the selecting includes, for each sub-block in the array:

determining a significance value of a right neighbor sub-block of the sub-block and a significance value of a bottom neighbor sub-block of the sub-block, and selecting one of a first L1 context model or a second L1 context model for decoding the significance value of the sub-block based only on the significance value of the right neighbor sub-block and the significance value of the bottom neighbor sub-block of the sub-block, wherein the first L1 context model is selected if neither the significance value of the right neighbor sub-block nor the significance value of the bottom neighbor sub-block is equal to one and the second L1 context model is selected if the significance value of the right neighbor sub-block or the significance value of the bottom neighbor sub-block is equal to one;

decoding, by the computing device, an L1 significance map that includes L1 significance values for sub-blocks in the array using the context models;

selecting, by the computing device, using a shared L0 context derivation process that applies to both the luma component and the chroma component, L0 context models wherein the L0 context models are selected from a shared set of L0 context models that apply to both the luma component and the chroma component and the selecting includes, for each sub-block in the array:

partitioning the array into a first region and a second region using a shared partitioning process, wherein the first region comprises a DC coefficient of the array and the second region comprises transform coefficients in the array other than the DC coefficient, selecting, for each sub-block having a non-zero significance value, when the sub-block is in the first region, a first L0 context model for decoding the significance value of the transform coefficients of the sub-block, selecting, for each sub-block having a non-zero significance value, when the sub-block is in the second region, one of a second L0 context model, a third L0 context model, a fourth L0 context model or a fifth L0 context model for decoding the significance value of a transform coefficient of the sub-block having a non-zero significance value based on significance values of four neighbor transform coefficients, wherein the second L0 context model is selected if there are no non-zero significance values among the four neighbor transform coefficients, the third L0 context model is selected if there is one non-zero significance value among the four neighbor transform coefficients, the fourth L0 context model is selected if there are two non-zero significance values among the four neighbor transform coefficients, and the fifth L0 context model is selected if there are more than two non-zero significance value among the four neighbor transform coefficients; and decoding, by the computing device, an L0 significance map that includes L0 significance values for sub-blocks in the array using the L0 context models.

3. A non-transitory computer-readable medium including program code executable by a processor for encoding video data, wherein the program code, when executed by the processor, causes the processor to perform operations, the operations comprising:

receiving an array of transform coefficients corresponding to a luma component or a chroma component of the video data;

selecting, using a shared L1 context derivation process that applies to both the luma component and the chroma component, L1 context models wherein the L1 context models are selected from a shared set of L1 context models that apply to both the luma component and the chroma component and the selecting includes, for each sub-block in the array:

determining a significance value of a right neighbor sub-block of the sub-block and a significance value of a bottom neighbor sub-block of the sub-block, and selecting one of a first L1 context model or a second L1 context model for encoding the significance value of the sub-block based only on the significance value of the right neighbor sub-block and the significance value of the bottom neighbor sub-block of the sub-block, wherein the first L1 context model is selected if neither the significance value of the right neighbor sub-block nor the significance value of the bottom neighbor sub-block is equal to one and the second L1 context model is selected if the significance value of the right neighbor sub-block or the significance value of the bottom neighbor sub-block is equal to one;

encoding an L1 significance map that includes L1 significance values for sub-blocks in the array using the context models;

selecting using a shared L0 context derivation process that applies to both the luma component and the chroma component, L0 context models wherein the L0 context models are selected from a shared set of L0 context models that apply to both the luma component and the chroma component and the selecting includes, for each sub-block in the array:

partitioning the array into a first region and a second region using a shared partitioning process, wherein the first region comprises a DC coefficient of the array and the second region comprises transform coefficients in the array other than the DC coefficient, selecting, for each sub-block having a non-zero significance value, when the sub-block is in the first region, a first L0 context model for encoding the significance value of the transform coefficients of the sub-block, selecting, for each sub-block having a non-zero significance value, when the sub-block is in the second region, one of a second L0 context model, a third L0 context model, a fourth L0 context model or a fifth L0 context model for encoding the significance value of a transform coefficient of the sub-block having a non-zero significance value based on significance values of four neighbor transform coefficients, wherein the second L0 context model is selected if there are no non-zero significance values among the four neighbor transform coefficients, the third L0 context model is selected if there is one non-zero significance value among the four neighbor transform coefficients, the fourth L0 context model is selected if there are two non-zero significance values among the four neighbor transform coefficients, and the fifth L0 context model is selected if there are more than two non-zero significance value among the four neighbor transform coefficients; and encoding an L0 significance map that includes L0 significance values for sub-blocks in the array using the L0 context models.

4. A non-transitory computer-readable medium have stored thereon program code executable by a processor for decoding video data, the program code comprising:

receiving a bitstream of compressed data, the compressed data including an array of transform coefficients that was previously encoded, the array corresponding to a luma component or a chroma component of the video data;

selecting, using a shared L1 context derivation process that applies to both the luma component and the chroma component, L1 context models wherein the L1 context models are selected from a shared set of L1 context models that apply to both the luma component and the chroma component and the selecting includes, for each sub-block in the array:

determining a significance value of a right neighbor sub-block of the sub-block and a significance value of a bottom neighbor sub-block of the sub-block, and selecting one of a first L1 context model or a second L1 context model for decoding the significance value of the sub-block based only on the significance value of the right neighbor sub-block and the significance value of the bottom neighbor sub-block of the sub-block, wherein the first L1 context model is selected if neither the significance value of the right neighbor sub-block nor the significance value of the bottom neighbor sub-block is equal to one and the second L1 context model is selected if the significance value of the right neighbor sub-block or the significance value of the bottom neighbor sub-block is equal to one;

decoding an L1 significance map that includes L1 significance values for sub-blocks in the array using the context models;

selecting using a shared L0 context derivation process that applies to both the luma component and the chroma component, L0 context models wherein the L0 context models are selected from a shared set of L0 context models that apply to both the luma component and the chroma component and the selecting includes, for each sub-block in the array:

partitioning the array into a first region and a second region using a shared partitioning process, wherein the first region comprises a DC coefficient of the array and the second region comprises transform coefficients in the array other than the DC coefficient, selecting, for each sub-block having a non-zero significance value, when the sub-block is in the first region, a first L0 context model for decoding the significance value of the transform coefficients of the sub-block, selecting, for each sub-block having a non-zero significance value, when the sub-block is in the second region, one of a second L0 context model, a third L0 context model, a fourth L0 context model or a fifth L0 context model for decoding the significance value of a transform coefficient of the sub-block having a non-zero significance value based on significance values of four neighbor transform coefficients, wherein the second L0 context model is selected if there are no non-zero significance values among the four neighbor transform coefficients, the third L0 context model is selected if there is one non-zero significance value among the four neighbor transform coefficients, the fourth L0 context model is selected if there are two non-zero significance values among the four neighbor transform coefficients, and the fifth L0 context model is selected if there are more than two non-zero significance value among the four neighbor transform coefficients; and decoding an L0 significance map that includes L0 significance values for sub-blocks in the array using the L0 context models.

* * * * *